(12) United States Patent
Sunkavally

(10) Patent No.: US 11,087,004 B2
(45) Date of Patent: Aug. 10, 2021

(54) ANONYMIZING DATA SETS IN RISK MANAGEMENT APPLICATIONS

(71) Applicant: RSA Security LLC, Bedford, MA (US)

(72) Inventor: Naveen Sunkavally, Cary, NC (US)

(73) Assignee: RSA Security LLC, Bedford, MA (US)

( * ) Notice: Subject to any disclaimer, the term of this patent is extended or adjusted under 35 U.S.C. 154(b) by 329 days.

(21) Appl. No.: 16/265,636

(22) Filed: Feb. 1, 2019

(65) Prior Publication Data

US 2020/0250315 A1 Aug. 6, 2020

(51) Int. Cl.
*G06F 21/00* (2013.01)
*G06F 21/57* (2013.01)
*G06Q 10/06* (2012.01)
*G06F 21/60* (2013.01)
*G06F 21/62* (2013.01)

(52) U.S. Cl.
CPC .......... *G06F 21/577* (2013.01); *G06F 21/604* (2013.01); *G06F 21/6254* (2013.01); *G06Q 10/0635* (2013.01); *G06F 2221/034* (2013.01)

(58) Field of Classification Search
CPC .. G06F 21/577; G06F 21/604; G06F 21/6254; G06F 2221/034; G06Q 10/0635
See application file for complete search history.

(56) References Cited

U.S. PATENT DOCUMENTS

| | | | |
|---|---|---|---|
| 9,123,054 B1* | 9/2015 | Villars | G06Q 20/382 |
| 2018/0082082 A1* | 3/2018 | Lowenberg | G06Q 20/10 |
| 2019/0050599 A1* | 2/2019 | Canard | G06F 16/24554 |
| 2019/0266353 A1* | 8/2019 | Gkoulalas-Divanis | G06F 21/6254 |
| 2020/0311300 A1* | 10/2020 | Callcut | G06F 21/6245 |
| 2020/0327252 A1* | 10/2020 | McFall | G06F 21/602 |

* cited by examiner

*Primary Examiner* — Brandon S Hoffman
*Assistant Examiner* — William A Corum, Jr.
(74) *Attorney, Agent, or Firm* — Danielson Legal LLC

(57) ABSTRACT

A method for anonymizing data sets for use with risk management applications comprises receiving a data set from a source, the data set containing a plurality of correlated attributes. This embodiment further comprises analyzing the plurality of correlated attributes to create an attribute classification. Applying a differential privacy algorithm to the plurality of correlated attributes if the attribute classification requires data randomization is likewise a part of this embodiment. The randomized data set is provided to a risk management application. The randomized data set is used to create a risk management report, wherein the risk management report is an output of the risk management application.

17 Claims, 5 Drawing Sheets

ANONYMIZING DATA SETS IN RISK MANAGEMENT APPLICATIONS

TECHNICAL FIELD

The field relates generally to information security, and more particularly managing differential privacy in risk management applications.

BACKGROUND

Various entities are subject to different types of security threats. Some security threats relate to networking and computer security for client devices used by members of an entity, such as a business, organization or other enterprise. Security threats include, for example, vulnerabilities in devices in an enterprise network, which present risks that can expose the enterprise and its users or devices. As enterprise networks continue to grow in scale, the task of scanning for such vulnerabilities in enterprise devices presents various challenges.

The process of risk assessment and risk monitoring often involves the collection and usage of data from disparate sources to help quantify the level of risk. In some cases, that collected data may be considered sensitive. There may be compliance or security reasons why certain people should not be exposed or have access to the exact data. User account management, personnel risk management, and healthcare risk management are examples of subdomains of risk management for which data sensitivity could be a concern. For instance, in the case of user account management, a subdomain of information security risk management, it may be useful from a risk management perspective to identify locations from which users are logging in or password strengths for certain accounts. Giving this information directly to the risk management office or passing this information to a third-party vendor or service hosted in the cloud, however, could raise compliance or security concerns.

There is thus a need for protecting sensitive information within an enterprise so that risk managers can perform their jobs effectively, while simultaneously balancing the need to protect sensitive information lest the enterprise inadvertently subject itself to a data breach.

SUMMARY

In one embodiment, a method for anonymizing data sets for use with risk management applications comprises receiving a data set from a source, the data set containing a plurality of correlated attributes. This embodiment further comprises analyzing the plurality of correlated attributes to create an attribute classification. Applying a differential privacy algorithm to the plurality of correlated attributes if the attribute classification requires data randomization is likewise a part of this embodiment. The randomized data set is provided to a risk management application. The randomized data set is used to create a risk management report, wherein the risk management report is an output of the risk management application.

Method embodiments are performed by at least one processing device comprising a processor coupled to a memory. The processing device may be implemented, for example, in one or more network devices in a computer network, in a governance, risk, and compliance center of an enterprise, or in a security analytics system or other type of network security system associated with the computer network or enterprise.

Other illustrative embodiments include, without limitation, apparatus, systems, methods, and computer program product comprising non-transitory, computer-readable storage media.

DETAILED DESCRIPTION

Figure 1:
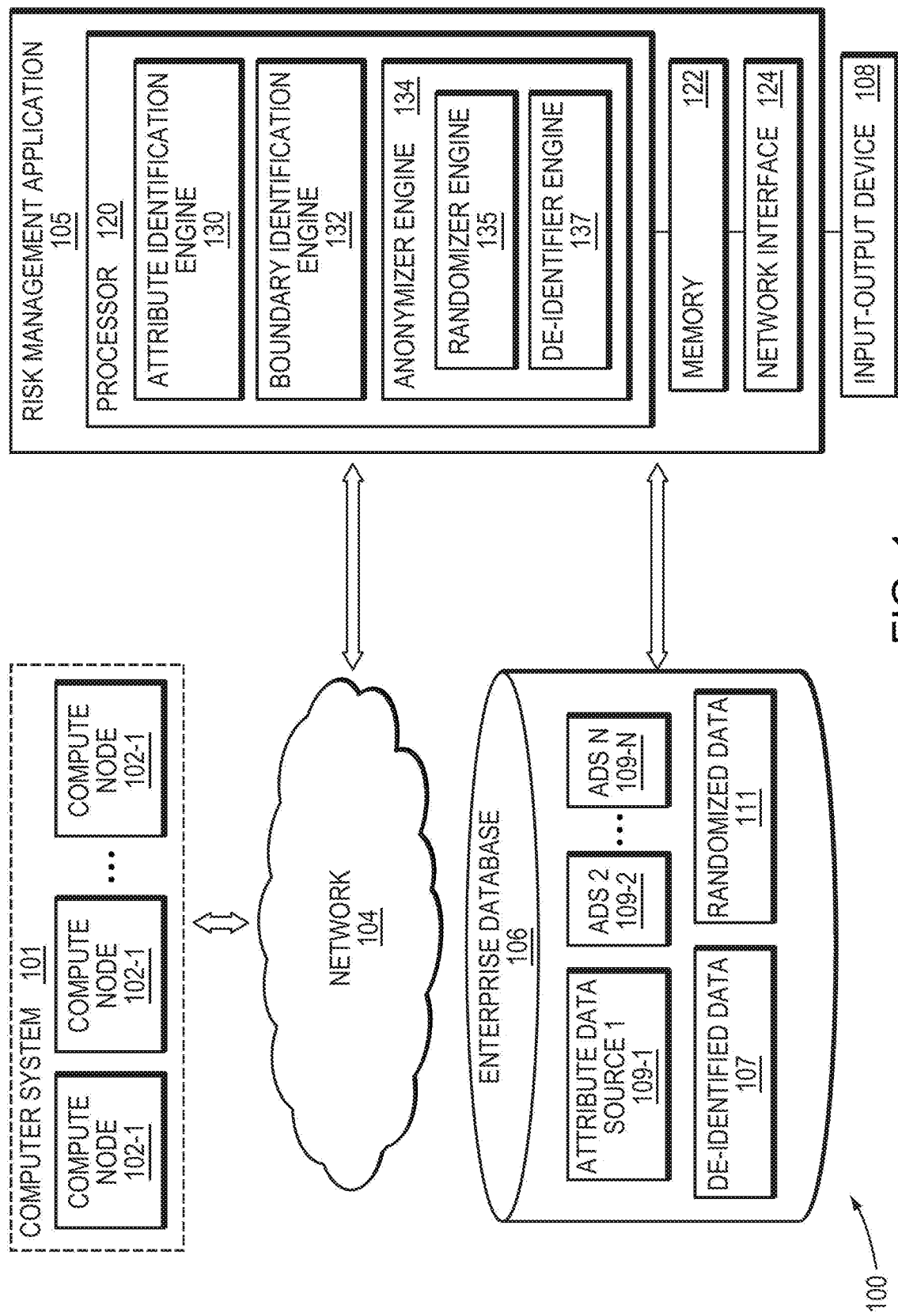
FIG. 1 is a block diagram of an information processing system configured for anonymizing data sets for use with a risk management application according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other types of enterprise computing and storage systems are also encompassed by the term "information processing system" as that term is broadly used herein.

As information collection, storage and proliferation has increased, so too has the need to monitor risks associated with information. The field of risk management is a broad field encompassing data storage, access to data, data transmission, and the like. The term "enterprise" as used herein is intended to be broadly construed to encompass an entity or entities having a common purpose. One example of an enterprise, without limitation, could be a company having multiple subsidiaries located throughout the world.

Given that an enterprise typically has a common purpose, or a unifying business goal, individuals within an enterprise may utilize one or more information processing systems. The contents within the information processing system enable users to access, store, read, save, download, and the like information related to the enterprise. In addition to providing access to enterprise data, enterprises must be aware of, and attendant to, the risks associated with storing and providing access to enterprise data. This risk management framework has evolved over time into what is commonly referred to as Governance, Risk and Compliance (GRC) Management.

Governance, risk and compliance management systems, such as RSA Archer® available from RSA Security LLC, whose parent organization is Dell Technologies, include vulnerability and risk management solutions for managing and addressing risks that arise from the existence of vulnerabilities in an enterprise network. The process of risk assessment and risk monitoring often involves the collection and usage of data from disparate sources to help quantify the level of risk. In some cases, collected data may be considered sensitive. There may be compliance or security reasons why certain people should not be exposed to, or have access to, the actual data.

As enterprise networks continue to grow in scale, the number of devices in the network exacerbates these issues. Enterprise networks may also include new and different types of devices that are not designed to be online at all times. For example, in the Internet of Things (IoT) context, some devices are by definition designed not to be online or connected at all times. Some IoT devices will produce, send, and receive data that may have risk management implications, e.g., healthcare data, GPS tracking data, and the like. Further, the number of devices is increasing in scale making these issues more challenging.

There is thus a need for reconciling an enterprise's access to enormous amounts of data, much of which can be sensitive, with Governance, Risk, and Compliance rules, law, policies and regulations. This is especially true because GRC Management varies from region to region depending upon local laws. Embodiments described herein meet this need by applying teachings from the field of differential privacy to risk management methods, systems, and products.

At a high level, the field of differential privacy provides probabilistic techniques that ensure that data collected about users and aggregate statistics computed from user data do not reveal compromising information about any individual user. Differential privacy techniques are parametric in nature. They can be tuned to provide different tradeoffs between privacy and utility.

There are two models for differential privacy, the local model and the central model. In the local model, user data is randomized upfront in such a way that subsequent computations using the data cannot reveal any user's individual data. In the central model, the raw user data is collected by a trusted central authority, and that central authority provides statistics about the raw user data using techniques that preserve the privacy of any individual's data.

In addition to differential privacy, personal data can be scrubbed so as to replace personal identifiers with tokenized values. These methods are not without risk, however, as evidenced by a now infamous de-anonymization incident perpetrated against a large content streaming company, which occurred in 2006. In that instance, the large content streaming company published 10 million movie rankings created by nearly 500,000 customers as part of a challenge for people to come up with better recommendation systems than the one the company was using. The data was anonymized by removing personal details and replacing names with random numbers, to protect the privacy of the recommenders. Two researchers from the University of Texas at Austin were able to de-anonymize some of the data by comparing rankings and timestamps with public information in an Internet movie database.

Differential privacy is a superior method of anonymizing data because it provides mathematical guarantees for privacy loss and it is not susceptible to linkage attacks, such as what occurred with the Netflix data. Accordingly, embodiments herein apply the teachings of differential privacy to the risk management domain.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a risk management application 105. The risk management application 105 could be an independent system, it could be hosted in the network 104, or it could be part of enterprise database 106.

The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The risk management application 105 has an associated database 106 configured to store data aspects of risk assessment and risk management operations. The database 106 more particularly stores attribute data from a variety of sources 109 as well as de-identified data 107 and randomized data 111.

The database 106 in the present embodiment is implemented using one or more storage systems associated with the risk management application 105. In some embodiments, a SQL server could be used for storage. In alternate embodiments, a structured data storage product could be used, for example and without limitation, MongoDb or Elasticsearch storage could be sued. Storage layers beneath the enterprise database 106 can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO,™ FlexOS,™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC of Hopkinton, Mass. Combinations of multiple ones of these and other storage products can also be used in implementing a given storage system in an illustrative embodiment.

Also associated with the risk management application 105 are input-output devices 108, which illustratively comprise keyboards, displays or other types of input-output devices in any combination. Such input-output devices 108 are used to support one or more user interfaces to the risk management application 105, as well as to support communication between the risk management application 105 and other related systems and devices not explicitly shown.

The computer system 101 and risk management application 105 in the FIG. 1 embodiment are assumed to be implemented using at least one processing platform each comprising one or more processing devices each having a processor 120 coupled to a memory 124. For the computer system 101, the processor and memory are part of computer node 102. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The computer system 101 and the risk management application 105 may be implemented on respective distinct processing platforms, although numerous other arrangements are possible. For example, in some embodiments at least portions of the computer system 101 and the risk management application 105 are implemented on the same processing platform. The risk management application 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the risk management application 105. Numerous other distributed implementations of one or both of the computer system 101 and the risk management application 105 are possible. Accordingly, the risk management application 105 can also be implemented in a distributed manner across multiple data centers.

More particularly, and as depicted in FIG. 1, the risk management application 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the risk management application 105 to communicate over the network 104 with computer system 101, and illustratively comprises one or more conventional transceivers.

Additionally, and as further detailed herein, the risk management application 105 can be implemented on premise (of an enterprise carrying out risk management operations) and/or in the cloud. The inputs for predicting risk impact and risk likelihood values can arrive from different business units (via computer system 101, for example) that can be located in different geographies.

The processor 120 further comprises an attribute identification engine 130, a boundary identification engine 132, and an anonymizer engine 134. The anonymizer engine 134 is itself comprised of a randomizer engine 135 and a de-identifier engine 137. It is to be appreciated that this particular arrangement of modules 130, 132, 134, 135, and 137 illustrated in the processor 120 of the FIG. 1 embodiment is presented by way of example only, and alternative arrangements can be used in other embodiments. For example, the functionality associated with the modules 130, 132, 134, 135, and 137 in other embodiments can be combined into a single module or separated across a larger number of modules. As another example, multiple distinct processors can be used to implement different ones of the modules 130, 132, 134, 135, and 137 or portions thereof.

At least portions of the attribute identification engine 130, the boundary identification engine 132, the anonymizer engine 134, the randomizer engine 135, and the de-identifier engine 137 may be implemented at least in part in the form of software that is stored in memory 122 and executed by processor 120.

It should be understood that the particular sets of modules and other components implemented in the system 100 as illustrated in FIG. 1 are presented by way of example only.

In other embodiments, only subsets of these components, or additional or alternative sets of components, may be used, and such components may exhibit alternative functionality and configurations.

By way of example, in other embodiments, the risk management application 105 can be eliminated and associated elements such as attribute identification engine 130, boundary identification engine 132, anonymizer engine 134, randomizer engine 135, and de-identifier engine 137 can be implemented elsewhere in the computer network 100.

An exemplary process utilizing attribute identification engine 130, boundary identification engine 132, anonymizer engine 134, randomizer engine 135, and de-identifier engine 137 of the risk management application 105 in conjunction with database 106 in computer network 100 will be described in more detail with reference to the flow diagram of FIG. 2 and the block diagram of FIG. 3.

Figure 2:
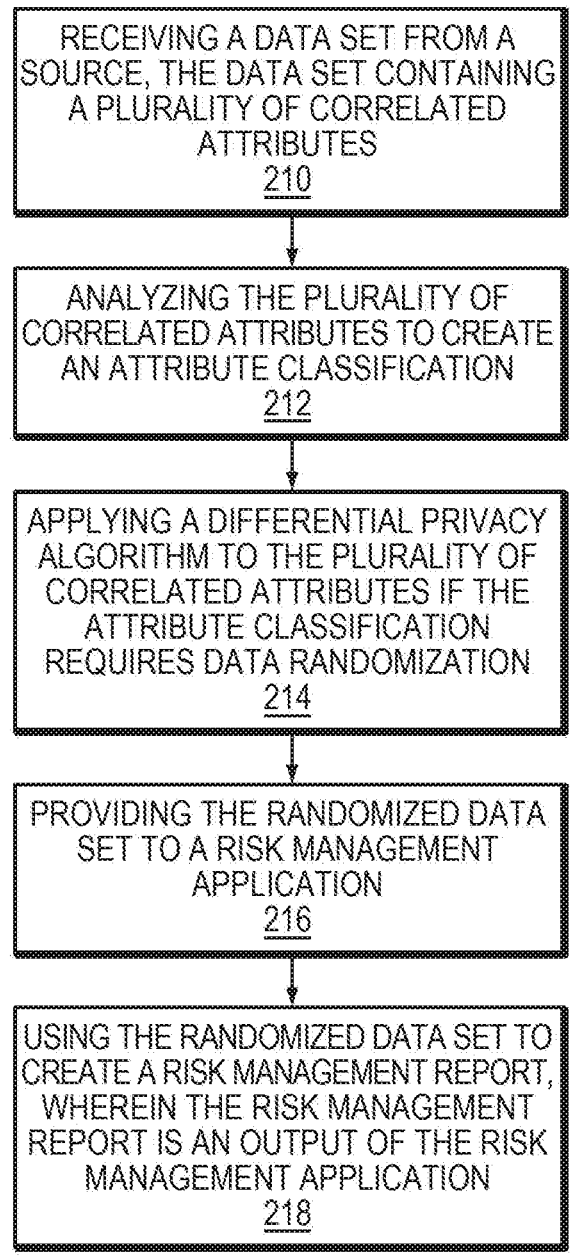
FIG. 2 is a flow diagram of an exemplary process for anonymizing data sets in risk management applications according to an illustrative embodiment.

With reference to FIG. 2, there is shown a method for anonymizing data sets in risk management applications. FIG. 3 depicts a block diagram showing how enterprise data, as depicted for example in FIG. 1, is parsed for purposes of risk management according to whether the data should be de-identified or randomized. In some embodiment, more sensitive data is randomized, and less sensitive data is de-identified.

Figure 3:
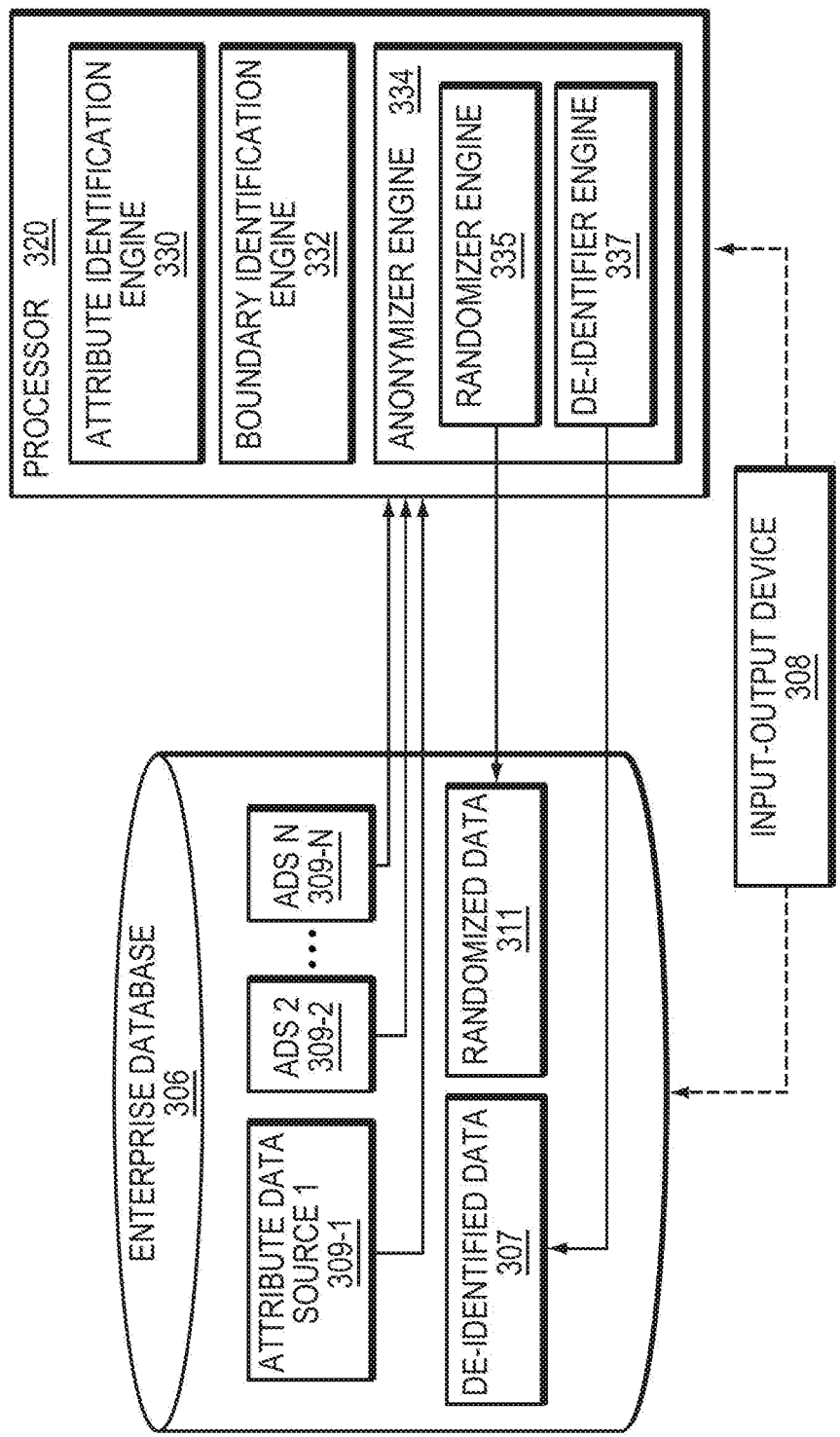
FIG. 3 is a block diagram of a portion of an information processing system configured for anonymizing data sets in a risk management application according to an illustrative embodiment.

Like reference numerals in FIG. 3 as compared with FIG. 1 have similar functionality as previously described with regard to FIG. 1. The enterprise database 306 is an enterprise-wide data repository. Accordingly, and depending upon the enterprise's business, enterprise database will inevitably store sensitive information. Given the distributed nature of many of today's enterprises, the location and source of these sensitive data can be disparate. A preliminary task of the risk management applications embodiments, therefore, is identifying sensitive attributes of data, e.g., passwords, medical information, social security numbers, employee identification numbers, salary information, confidential information, personnel performance records, banking information, national security information, and the like.

Some data, such as name or place of birth may be considered sensitive enough to de-identify, but not sensitive enough to randomize or secure. Other data, such as social security number or health information in most enterprises would be considered sensitive enough to randomize. One of the advantages of embodiments is the flexibility built into the system, which allows enterprises to define for themselves the types of information that should be de-identified or randomized. In addition, embodiments provide a privacy loss setting, sometimes represented as the letter epsilon, which allows enterprises to control how much randomization to inject into the randomized data. The higher the privacy loss setting, the more random the data become. The tradeoff, however, is the less usable the data are when the privacy loss setting is increased.

The attribute identification engine 330 performs these functions, namely classifying attributes within the data sets. In some embodiments, data sets contain a plurality of correlated attributes. The attribute identification engine 330, as will be discussed in more detail with regards to FIG. 2, analyzes 212 the plurality of correlated attributes so as to create an attribute classification. In embodiments, the attribute identification engine 330 can classify attributes based on a data type, e.g., Boolean, integer, floating point, geospatial coordinates, text, and the like.

This classification determines the level of anonymization, if any, that is applied to the plurality of correlated attributes. Some data will be de-identified, other data is randomized, and some data may be unaltered.

The attribute identification engine 330 also identifies data sources hosting data having these sensitive attributes. In embodiments, risk management personnel tailor the attributes identified as "sensitive" based upon the enterprise, local laws, enterprise policy, and the like. Moreover, data sources vary as server locations and functions change. Setting these parameters could be performed by a person, a team, machine learning, through software, or by using a default setting within the system itself.

Once the attribute identification engine 330 identifies attribute data 309, the attribute data 309 is stored in files segregated by source. In alternate embodiments, attribute data 309 could be combined into a single file or comingled into more than one file without taking its source into account. Attribute data 309 is stored in database 306 in an embodiment. In alternate embodiments, attribute data 309 is stored in the cloud 104. In additional embodiments, attribute data 309 is distributed among multiple storage locations.

Data sources could host multiple sensitive attributes. Note that an attribute data source does not need to have its data persisted in any form. For instance, an attribute data source can send its data in a streaming manner to the randomizer engine 335 or the de-identifier engine 337 over a message bus. Alternatively, the randomizer engine 335 or de-identifier engine 337 could connect in (pull) data from the attribute data sources 309 using an API or database queries.

Boundary identification engine 332 identifies geographic/network boundaries for attribute data 309. These geographic/network boundaries, also called data segregation boundaries, are used to determine a physical geographic boundary or boundaries within which attribute data 309 should be stored. In some instances, for example, attribute data 309 may be highly sensitive requiring special storage security. In other embodiments, the sensitivity of attribute data may require on premise only storage, duplicate storage, distributed storage, and the like.

In some instances, attribute data 309 that has not been either randomized via randomizer engine 335 or de-identified via de-identifier engine 337 is kept separate from data that has been randomized or de-identified.

A network boundary is typically a separate IP subnet protected by a firewall and other security controls. The security controls would be set up to only allow data that has been randomized to leave the network boundary. In conjunction with the network boundary, a geographic boundary could also be used to adhere to compliance regulations in different jurisdictions. For instance, if users are in the European Union (EU) and there is a compliance regulation stipulating that sensitive user data cannot leave the EU, a geographic boundary can be established such that only data that has been randomized/randomized is allowed to leave the risk management application resides in the US).

Having identified attribute data 309, anonymizer engine 334 determines whether the attribute data 309 should be de-identified using de-identifier engine 337 or randomized using randomizer engine 335. Randomizer engine 335 transforms the attribute data 309 using a random process, choosing from a range of different algorithms based on the attribute type (categorical, numerical, geospatial, etc.), and using the privacy loss setting. Randomizer engine 335 emits randomized data 311 into the data storage layer used by the enterprise's risk management software.

In embodiments, data segregation boundaries are also used to determine where attribute data 309 will be converted to de-identified data 307 or randomized data 311.

De-identified data 307 and randomized data 311 can be stored in database 306 in one embodiment. De-identified data 307 or randomized data 311 could either both or individually be stored elsewhere in accordance with geographic/network boundaries. Irrespective of storage location, risk management personnel, or automated software in alternate embodiments, could access de-identified data 307 and randomized data 311 via input-output device 308.

FIG. 2 details a method for anonymizing data sets for use with risk management applications. According to this method, a risk management application 105 receives 210 a data set from a source. The source could be a computer node 102, or an enterprise database 106 in some embodiments. The data set contains a plurality of correlated attributes. The method embodiments analyze 212 the plurality of correlated attributes in order to create an attribute classification. Attribute classifications vary depending upon the sensitivity of the data.

In some embodiments risk management users utilize privacy loss settings that control how much randomization or de-identification is applied to data sets. Additionally, users can control in embodiments which attributes should be considered when determine what data should be randomized, de-identified, or left unaltered.

Once an attribute identification engine 330 has created 212 attribute classifications, anonymizer engine 334 applies 214 a differential privacy algorithm to the plurality of correlated attributes in order to randomize the plurality of correlated attributes into a randomized data set. In some embodiments, the differential privacy algorithm could be locally differentially private. In alternate embodiments, noise could be added to the plurality of correlated attributes. The amount of noise could vary in accordance with the privacy loss setting established by a user. In yet additional embodiments, the noise could change as a value of a probabilistic distribution of one of more of the plurality of attributes.

After the plurality of correlated attributes have been anonymized into a randomized data set, the randomized data set is provided 216 to a risk management application. The randomized data set is used 218 to create a risk management report, which is an output of the risk management application. Risk management reports created in this fashion allow users to have visibility into data in order to calculate risk without actually being privy to the exact details of the data.

In addition to randomized data, it is often helpful for risk management users to have access to information that is less sensitive that data that is randomized. Referring to FIG. 3, if anonymizer engine 334 determines that a plurality of correlated attributes are sensitive enough to require de-identification, embodiments apply a de-identifying algorithm to the plurality of correlated attributes. Once data has been deidentified, it can be provided to the risk management application. In addition, these deidentified data sets can also become part of the risk management report.

In some embodiments, a data set is dynamically created.

In an exemplary use case, a risk manager may want to determine password strength across an enterprise. It would be beneficial for the risk manager to be able to calculate an aggregate score for all users without knowing the exact password strength of each individual user. In a second example, an insurance company can process medical records for groups in order to determine risks of a particular disease without providing access to any one individual's actual medical records.

Risk management software typically measures risk using a formula applied against the data stored in its backend. This formula is customizable and varies from enterprise to enterprise. It's typically implemented in the form of ad-hoc queries against the backend. To the risk management software, data that was randomized appears no different from data that was not randomized.

Returning to FIG. 2, the privacy loss setting controls the amount of randomization applied 210 to the data so as to create randomized data 311.

In some embodiments, anonymizing sensitive information associated with the data in the data sets includes removing identifying information for preserving privacy of the data.

In some embodiments, a risk management score can be included for one or more of a set of sensitive attributes. In some embodiments, the method includes identifying a set of sensitive attributes associated with each set of the plurality of data sets. Identifying a set of sensitive attributes could be performed by a user, a team, machine learning, through software, or by using a default setting within the system itself.

In embodiments, anonymizing sensitive information associated with data in the plurality correlated attributes comprises determining a subset of sensitive attributes that need to be randomized by applying the differential privacy policy and determining a subset of attributes that need to be deidentified.

Some embodiments additionally transform a data set using a random process based on the subset of sensitive attributes determined to be randomized by using the privacy loss setting identified for the subset of sensitive attributes.

Additional examples of processing platforms utilized to implement systems for managing differential privacy in a risk management application in illustrative embodiments will be described in more detail below in conjunction with FIGS. 4 and 5.

It is to be appreciated that the foregoing advantages are illustrative of advantages provided in certain embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102 and risk management application 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
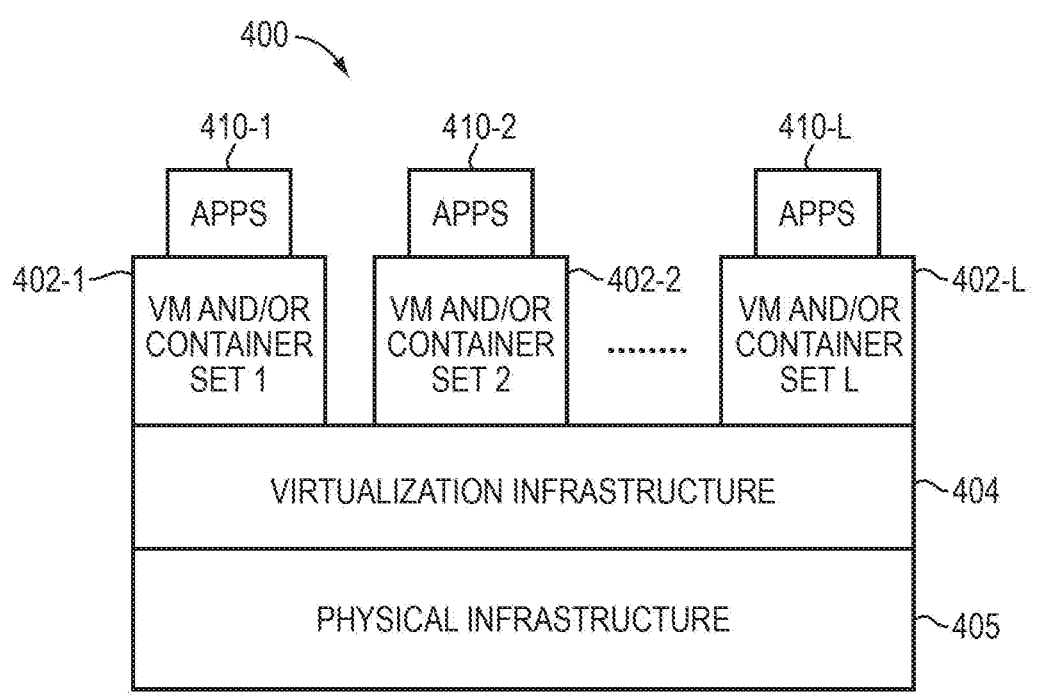
FIGS. 4 and 5 show examples of processing platforms that may be utilized to implement at least a portion of an information processing system in illustrative embodiments.
Figure 5:
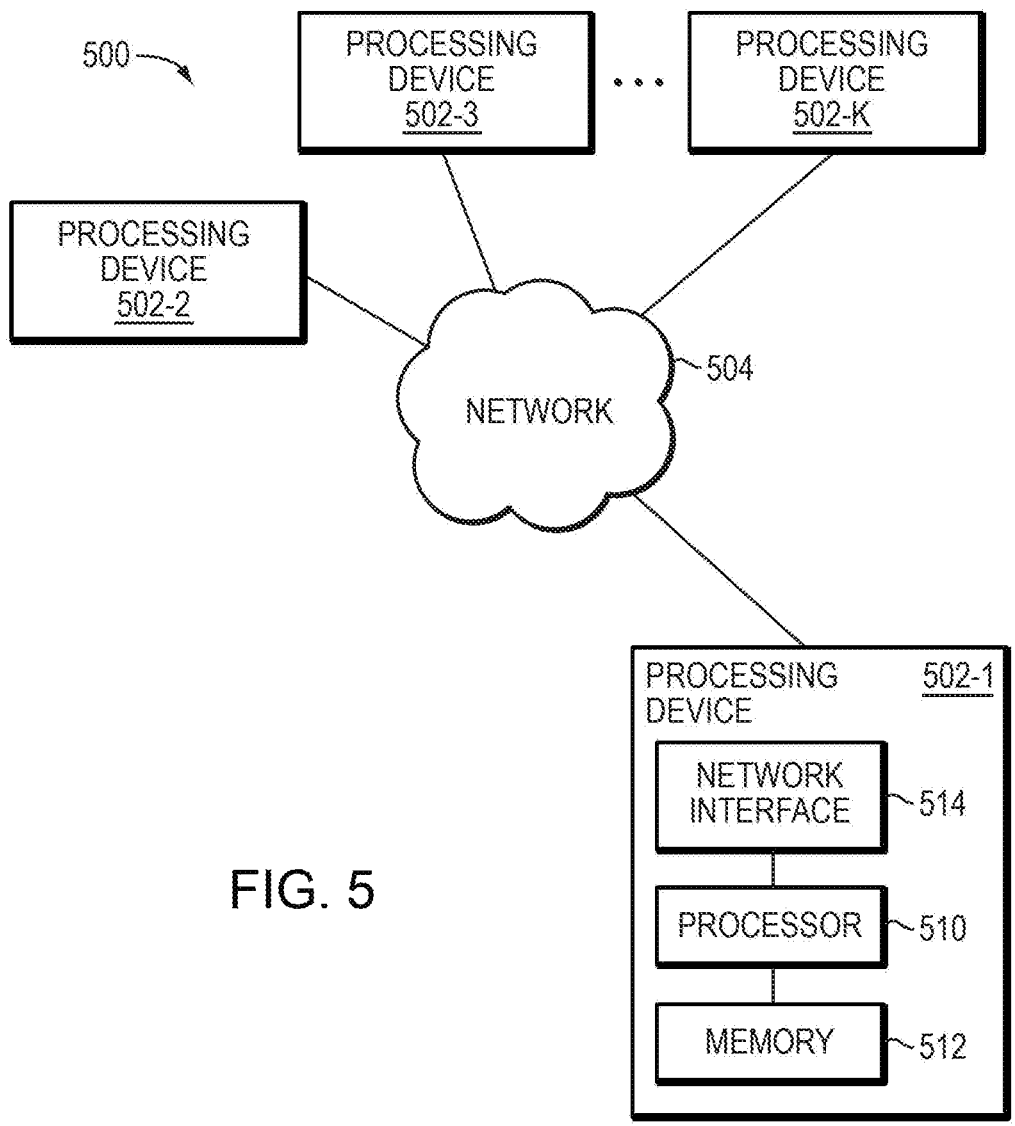

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments is the VMware® vSphere® which may have an associated virtual infrastructure management system such as the VMware® vCenter™.

The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRai™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute nodes 102 and the risk management application 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computer systems, compute nodes, storage systems, and storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

It is to be appreciated that the foregoing advantages are illustrative of advantages provided in certain embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102 and risk management application 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2 . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute nodes 102 and the risk management application 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computer systems, compute nodes, storage systems, and storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for anonymizing data sets for use with risk management applications, the method comprising:
   receiving a data set from a source, the data set containing a plurality of correlated attributes;
   analyzing the plurality of correlated attributes to create a geospatial classification;
   determining whether the geospatial classification requires data randomization or deidentification;

applying an anonymization algorithm to the plurality of correlated attributes, wherein the anonymization algorithm applied depends on the determination of whether the geospatial classification requires data randomization or deidentification;

providing the anonymized data set to a risk management application; and using the anonymized data set to create a risk management report, wherein the risk management report is an output of the risk management application.

2. The method of claim 1 further comprising adding noise to one or more of the plurality of correlated attributes while applying the anonymization algorithm.

3. The method of claim 2, wherein the amount of noise is determined by a privacy loss setting.

4. The method of claim 2 wherein the noise changes as a value of a probabilistic distribution of the one or more plurality of attributes.

5. The method of claim 1, wherein the source is a data storage device and the data set corresponds to information related to an enterprise.

6. The method of claim 1 wherein the data set is dynamically created.

7. The method of claim 1 wherein the risk management report includes an aggregate value for the anonymized data set.

8. A system for managing privacy in risk management applications comprising a storage device and at least one hardware processor configured for:

receiving a data set from a source, the data set containing a plurality of correlated attributes;

analyzing the plurality of correlated attributes to create a geospatial classification;

determining whether the geospatial classification requires data randomization or deidentification;

applying an anonymization algorithm to the plurality of correlated attributes, wherein the anonymization algorithm applied depends on the determination of whether the geospatial classification requires data randomization or deidentification;

providing the anonymized data set to a risk management application; and using the anonymized data set to create a risk management report, wherein the risk management report is an output of the risk management application.

9. The system of claim 8, wherein the system is further configured for adding noise to one or more of the plurality of correlated attributes while applying the anonymization algorithm.

10. The system of claim 9 wherein the amount of noise is determined by a privacy loss setting.

11. The system of claim 10 wherein the noise changes as a value of a probabilistic distribution of the one or more plurality of attributes.

12. The system of claim 8 wherein the source is a data storage device and the data set corresponds to information related to an enterprise.

13. The system of claim 8 wherein the data set is dynamically created.

14. The system of claim 8 wherein the risk management report includes an aggregate value for the anonymized data set.

15. A computer program product comprising a non-transitory processor-readable storage medium having stored therein program code of one or more software programs, wherein the program code when executed by at least one processing device causes the at least one processing device to perform the following:

receive a data set from a source, the data set containing a plurality of correlated attributes;

analyze the plurality of correlated attributes to create a geospatial classification;

determine whether the geospatial classification requires data randomization or deidentification;

apply an anonymization algorithm to the plurality of correlated attributes, wherein the anonymization algorithm applied depends on the determination of whether the geospatial classification requires data randomization or deidentification;

provide the anonymized data set to a risk management application; and use the anonymized data set to create a risk management report, wherein the risk management report is an output of the risk management application.

16. The computer program product of claim 15 further configured to add noise to one or more of the plurality of correlated attributes while applying the anonymization privacy algorithm.

17. The computer program product of claim 16, wherein the amount of noise is determined by a privacy loss setting.

* * * * *